Dec. 17, 1963  H. TRIPPEL  3,114,347
AMPHIBIOUS VEHICLE
Filed Jan. 23, 1961  4 Sheets-Sheet 2

INVENTOR
HANNS TRIPPEL
BY Christie, Parker & Hale
ATTORNEYS.

Dec. 17, 1963   H. TRIPPEL   3,114,347
AMPHIBIOUS VEHICLE
Filed Jan. 23, 1961   4 Sheets-Sheet 3
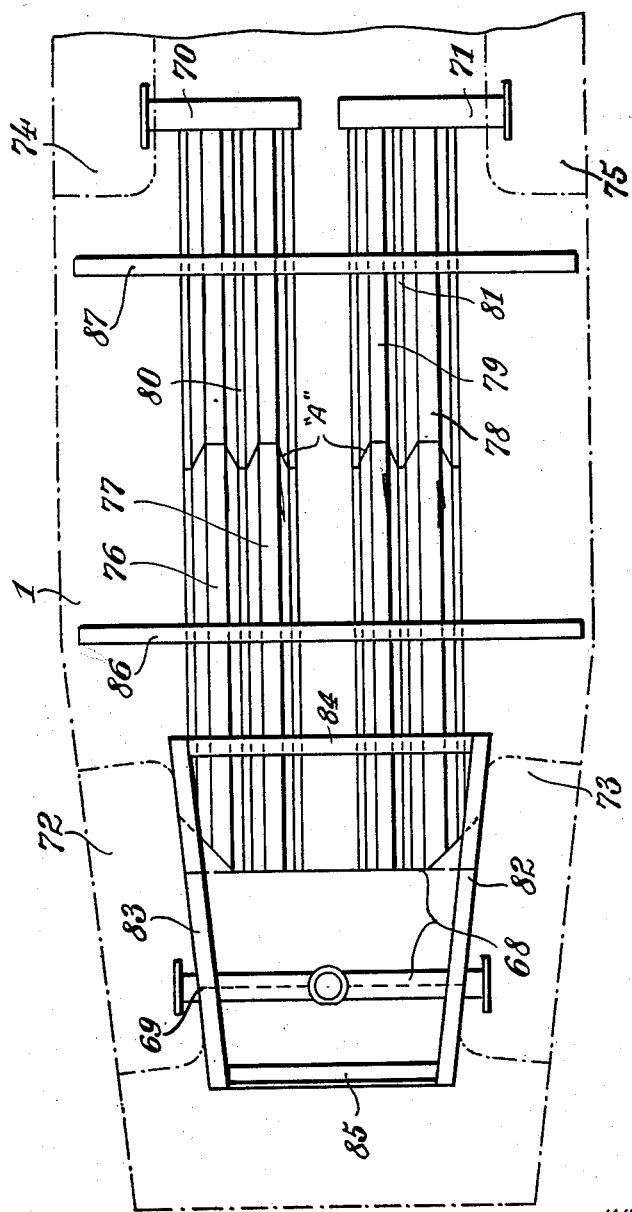
INVENTOR.
HANNS TRIPPEL
BY Christie, Parker & Hale
ATTORNEYS.

Dec. 17, 1963 H. TRIPPEL 3,114,347
AMPHIBIOUS VEHICLE
Filed Jan. 23, 1961 4 Sheets-Sheet 4
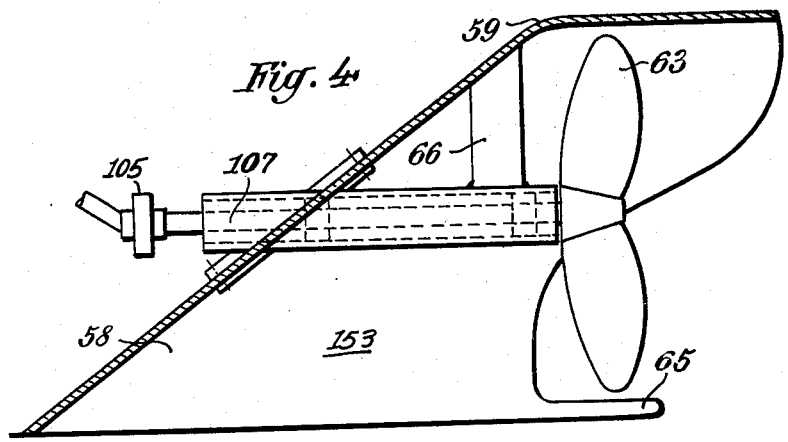
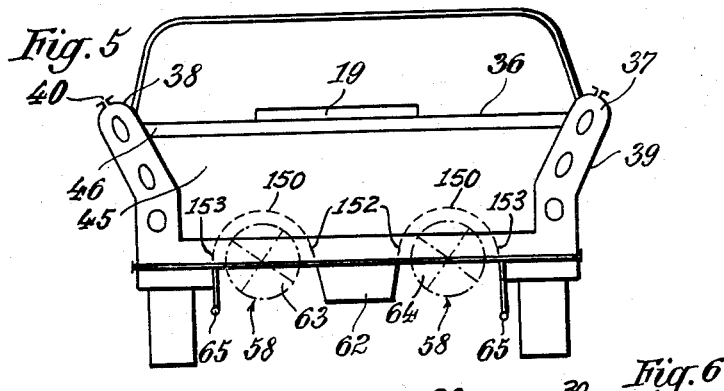
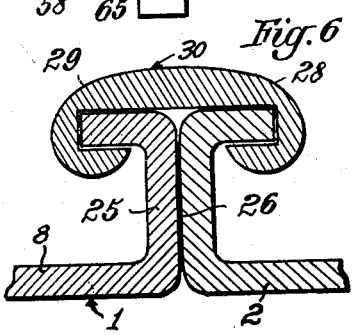
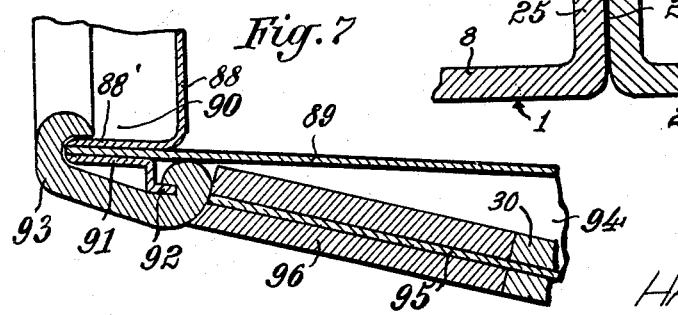
INVENTOR.
HANNS TRIPPEL
BY Christie, Parker & Hale
ATTORNEYS.

United States Patent Office 3,114,347
Patented Dec. 17, 1963

3,114,347
AMPHIBIOUS VEHICLE
Hanns Trippel, Sprendlingen, Kreis Offenbach, Germany, assignor, by mesne assignments, to Amphicar Corporation of America, New York, N.Y., a corporation of New York
Filed Jan. 23, 1961, Ser. No. 84,252
Claims priority, application Germany Jan. 21, 1960
12 Claims. (Cl. 115—1)

The present invention concerns an amphibious vehicle having a body formed as a buoyant structure and having wheels and driving means for water travel driven by a common power unit.

Known amphibious vehicles are relatively expensive to manufacture, largely because the usual construction of the bodywork in the shape of a boat is particularly expensive. Moreover, the additional provision of a screw propeller, as compared with a power-driven land vehicle, necessitates special stern constructions. Consequently the suspension and mounting of the screw propeller must also be taken into consideration and a shape must be found for providing good flow characteristics. In particular, it is desired that the body be shaped for movement through the water to avoid strong vortex formation in the wake and slipstream adjacent to the body.

Known amphibious vehicles which are provided with a motor in the stern have a pivotable propeller shaft which must be put into its driving position before travelling on water. Consequently manoeuvrability of the vehicle is impaired.

Also, with amphibious vehicles of this type having motors in the stern, particular problems arise in ventilating the motor since the conventional ventilation openings discharge from the forward part of the boat towards the cockpit so that the engine noise emitted often annoys the driver of the vehicle.

An object of the invention is to provide an amphibious vehicle which can be manufactured economically, which results in an elegant land vehicle, and which avoids the disadvantages of the known amphibious vehicles.

Accordingly, the present invention provides that the sheetmetal bodywork consists of surfaces which are curved and/or rounded off in only one plane and which are welded together. This construction avoids the manufacture of spherical, curved plate members.

It is desirable to use corrosion resistant metals in the construction of an aquatic vehicle, but since the vehicle of this invention is also utilized on land it is aesthetically desirable to provide a vehicle having an appearance resembling an automobile. Modern automobiles usually include doubly curved surfaces. Corrosion resistant materials, however, are difficult to deep draw or form into doubly curved figurations.

It is therefore an object of this invention to provide an amphibious vehicle having a body configured of simple curves, but which body also presents a pleasing appearance and favorable water-resistance properties. According to a preferred embodiment of the present invention, the screw can be raised to the height of the rubbing strake of the boat, i.e. to a height which is in or above the surface of the water with the boat floating, and is connected by a weld seam on outwardly or inwardly turned edges to the upper shell of the bodywork.

Another feature and object of the invention is the use of two rigidly-mounted screw propellers provided in tunnel-like channels formed in the vehicle hull above the plane of the bottom of the hull, which channels are shaped hydrodynamically to provide good propulsive efficiency of the propellers. These propeller channels facilitate rigid and extensive covered installation of the propellers so that the propellers are protected from damage when the vehicle operates in partially buoyant or land based condition. A further advantage is that the propeller race tunnels provide comparatively unusually small disturbance of the water at the stern of the vehicle whereby increased speed in the water results.

Another object of the invention is to provide a single engine in the rear of the vehicle which is adapted to drive the rear wheels of the vehicle and also at least one stern mounted propeller. To accomplish this object the invention includes a differential for the rear wheels and a transmission unit, as well as a reduction gear train for the propellers. The transmission and the reduction gear are independently associable in operative relation with the engine, or they may be simultaneously engaged or disengaged from the engine by a separate clutch unit.

Another object of the invention is to combine the structures of the rear wheel recesses and the propeller race tunnels into a structure which has structural integrity yet which exhibits beneficial water-flow resistance properties.

And still another object of the invention is to provide an engine air intake and exhaust system which is compatible with land and water orientated modes of operation of the vehicle. The air intake system is such that spray—encountered during nautical uses—does not adversely affect operation of the engine. This object is accomplished while maintaining the buoyant property of the vehicle body and also while providing a pleasant appearing vehicle.

In order that the invention may be more readily understood, preferred embodiments thereof are described below in conjunction with the accompanying drawings, in which:

FIG. 1a shows a section of FIG. 1 corresponding to the line I—I in FIG. 1,

FIG. 1b shows a section of FIG. 1 corresponding to the line 1b—1b of FIG. 1a.

FIG. 3 shows a plan view of the floor well, FIG. 4 is a fragmentary cross-sectional view taken along the line IV—IV of FIG. 2.

FIG. 5 shows a view of the rear of the vehicle,

FIG. 6 shows a partial horizontally rather than vertically oriented section of the connecting seam between the vehicle well and the upper shell of the housing and, FIG. 7 shows a horizontal section through FIG. 1 in the position marked A.

Figure 2:
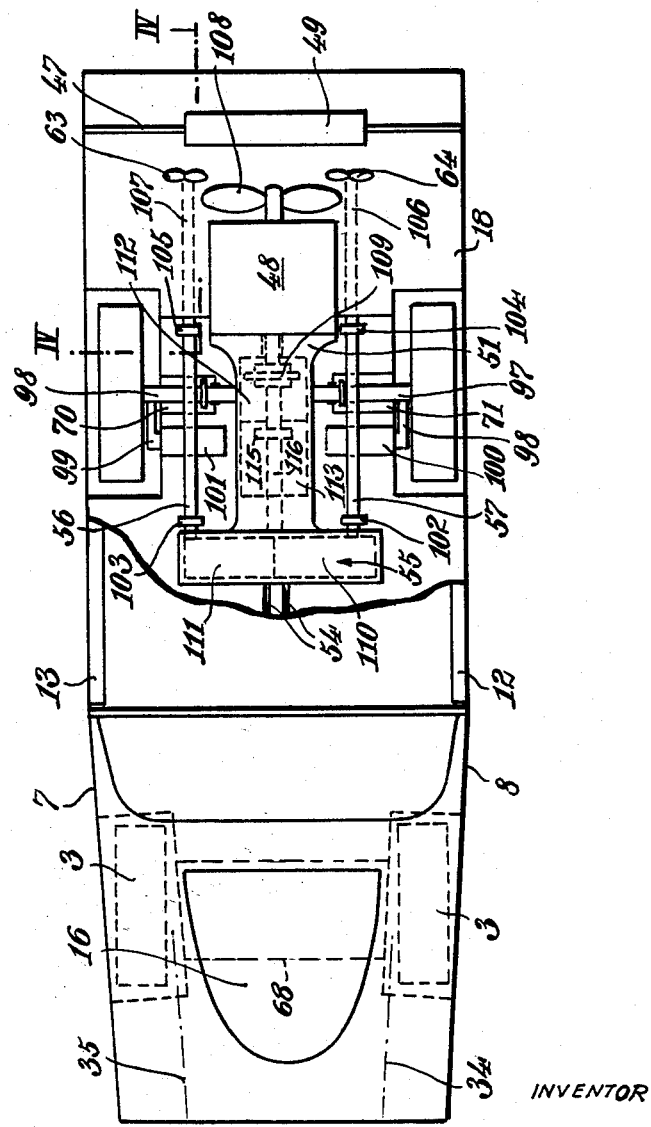
FIG. 2 shows the plan view of the vehicle with the upper bodywork partly broken away.

The vehicle body consisting essentially of the well 1 and the associated upper shell 2 of the floating body is provided with front wheels 3 and rear wheels 4 arranged in wheel recesses 5 and 6, respectively. These recesses are only formed in the well 1 and are so deep that the wheels, as shown in FIG. 2, lie inside the outer extremities of the vehicle determined by the side walls 7 and 8. Consequently the upper body shell side walls lie outboard of and extend downwardly of the upper regions of the wheel recesses.

The cockpit is situated in the upper shell and is provided for example with two seats 10 and 11. The cockpit is also provided with two doors 12 and 13 arranged adjacent the front seat 11. These doors are situated in the side walls of the upper shell of the floating body. The cockpit is closed at the front by a wall 14 so that a space 15 is provided in the front part of the vehicle which can be used for example as a luggage compartment and which can be closed by a cover 16. The fuel tank can be placed in this space. A wall 17 is situated behind and beneath the rear seat and divides off the motor space 18 which lies in the rear of the vehicle. The motor space is likewise accessible through a flap 19 (FIG. 5) in the covering wall of the motor space.

In the cockpit of the vehicle, shown uncovered in the drawings, a steering column 20 and instrument panel 21 are situated corresponding to the arrangement of a conventional power driven vehicle. Moreover a frame 22 serving to hold the curved windscreen 23 is placed over the cockpit at a distance rearwardly from the front edge thereof. Windable windows 24 are provided in the usual way in the doors 12 and 13. Moreover, a removable hardtop may be provided as in a limousine.

Figure 1:
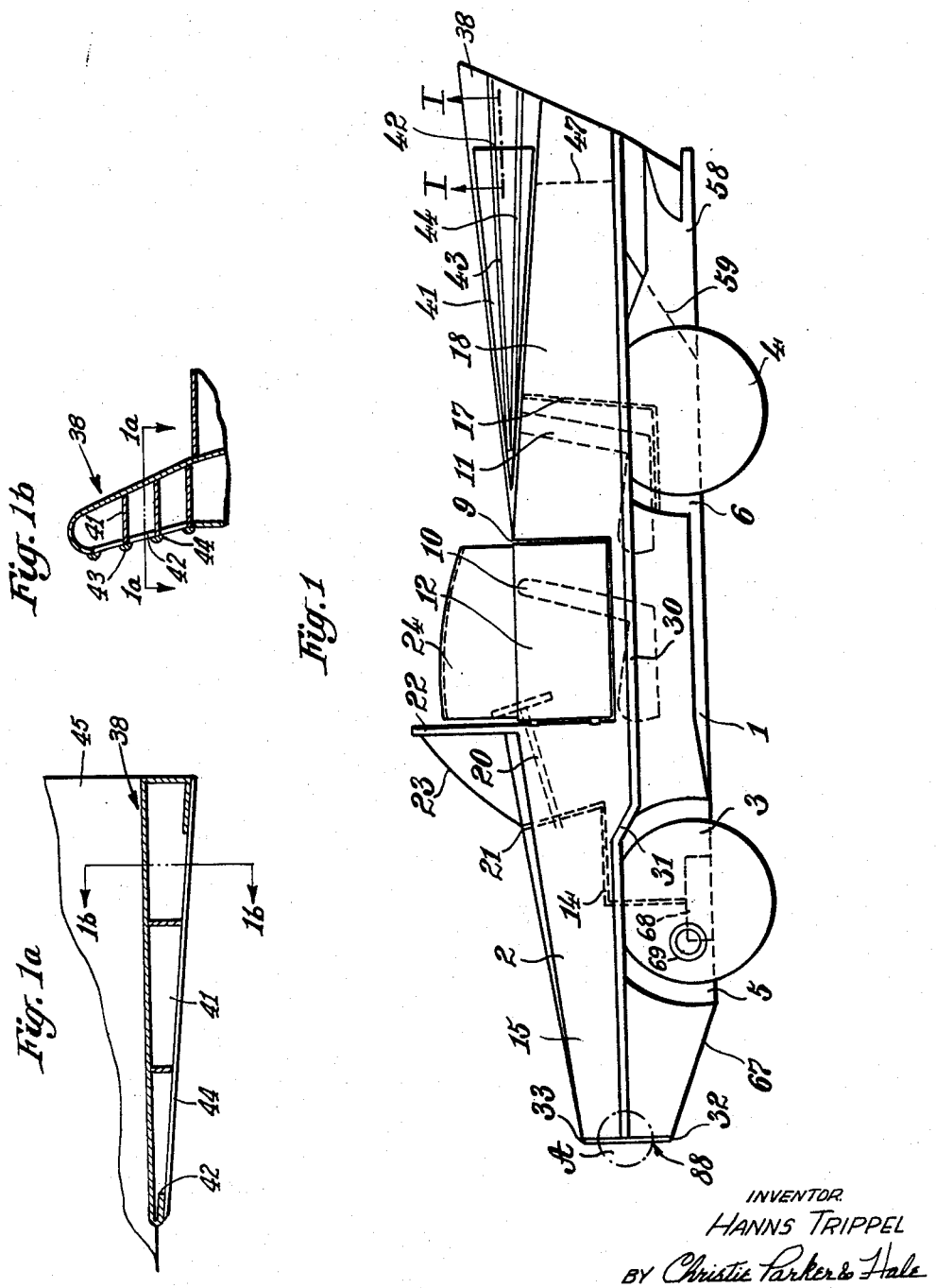
FIG. 1 shows in side view an amphibious vehicle of the invention.

The lower body member or well 1 is constructed with high side walls whose upper edges lie at least 20 cms., preferably 30 cms., above the floor of the well and which reach above the waterline of the vehicle. In this way it is particularly easy to produce a floating body which is heavier at the bottom. In the embodiment shown, the upper edges 25 of the side walls 7 and 8 of the well, which is shown in FIG. 6, are curved outwardly into a U-shape and are welded by a welding seam 26 to a corresponding edge 27 of the side walls of the upper shell 2 of the bodywork. This embodiment facilitates, on the one hand, the particularly simple manufacture of this connection since electrodes formed as rollers can be guided along the hollow space of the U-shaped section. The flanges provided projecting outwardly from the vehicle have substantially vertical members 28 parallel to sidewalls 7 and 8 and which serve as a rubbing strake 30 of the vehicle. According to the preferred embodiment of the invention, the flanges are covered by a profile band 29 of synthetic material. The rubbing strake so produced as shown in FIG. 1 stretches over the entire length of the vehicle. It does not run in a single plane but in the front part of the vehicle, approximately at the rear extremity of the front wheel recess 5, it runs in steps and is provided with an inclined intermediate piece 31. The provision of the rubbing strake 30 along the sides of the vehicles gives the bodywork a pleasing appearance, since it is a decorative band which can be made of a coloured synthetic material. As shown in FIG. 6 the outer sides of the profile band 29 are curved to provide resilience.

FIG. 3 is a plan view of the well 1. It can be seen that in the front part of the well, a transverse channel 68 is provided for receiving the track rods and drop-arms for the steering system. Furthermore a passage 69 for example of rectangular cross-section is provided in this channel 68 as a reinforcement for the channel. The passage mounts a front wheel torsion spring (not shown) at each of its opposite ends. Two coaxial channels or enclosures 70 and 71 are provided in the rear part of the well. Channels 70, 71 have their adjacent or inboard ends spaced apart from each other. The opposite or outboard ends of the channel discharge into rear wheel recesses 74 and 75. Rear axle bearings seal the inboard ends of the channels to rear axles of the vehicle and provide a watertight seal between the interior of the channels and the interior of the vehicle well by means which may be conventional and within the talents of those skilled in the art. These channels preferably have elliptical cross-sections and substantially coaxially receive the rear axles of the vehicle. The channels 70, 71 discharge in the same way as the transverse channel 68 into the inwardly projecting wheel recesses of the well, which recesses are designated 72, 73 for the front wheel and 74, 75 for the rear wheels.

Between the reinforcements provided by the channels 70, 71, on the one hand, and the transverse channel 68, on the other hand, there are one or more longitudinal sections 80, 81 formed from sheet material. For example, each section 80 and 81 has two raised U-formed ribs 76, 77 and 78, 79 respectively. These longitudinal sections 80 and 81, in combination with the transverse reinforcing members 68 to 71, give the well as lower body part 1 rigidity and freedom from distortion. The rigidity is increased even more by transverse frames 86 and 87 positioned in abutment with the outer sides of the well. The transverse cross-sectional profile of reinforcing sections 80 and 81 are represented by heavy dark lines "A" in FIG. 3.

The front part of the well is also supported since a frame of longitudinal supports 82, 83, which are fastened to and flank the wheel recesses 72 and 73, and transverse supports 84 and 85 is fastened to the front transverse channel 68 and to the longitudinal reinforcements 80 and 81. In plan view, FIGURE 3, the frame comprising elements 82–85 is trapezoidal in shape and has its short base disposed toward the forward end of the vehicle. The frames 82 to 85 extend above the transverse channel 68 towards the front until they intersect the raised section 67 of the floor of the well to provide good stability. It is obvious that the support 85 is so placed that one of its cross members lies flat upon the inclined floor section 67 of the well.

The rear support 84 of the frame is provided on the longitudinal sections 80, 81 and fastened thereto so that the connection between these and the transverse channels 68 is improved.

With this simpler design the construction of the floor section of the vehicle ensures considerable stability without need of a tubular frame or the like. A particular advantage of such amphibious vehicles is that the longitudinal sections 80 and 81 projecting high above the well floor and the frames 86, 87, arranged a distance from the floor, forms the bilge.

The floor of the well 1 is inclined upwardly and forwardly from channel 68 toward a front end panel 32 for the vehicle. The front panel is simple to manufacture as it is essentially flat and consists of a plate 88 welded into the opening formed between the well 1 and the upper shell 2. In the section of the front panel 32 lying above and outwardly thereof are situated the headlamps of the vehicle. It must be mentioned that the front part of the upper side 33 of the shell 2 of the body can be provided with a curvature only in the transverse plane of the vehicle, whereby, for example, to make the front panel 32 deeper. Impressions corresponding to lines 34 and 35 (FIGURE 2) are provided to mark the section of the front panel 32 carrying the headlamps. In this way the forward view from the vehicle is also improved since the upper part 33 falls away in front at an angle.

The covering wall 36 of the motor space 18 has raised side edges to form the rearwardly inclined floats 37 and 38, together with the adjacent sections of the side walls 7 and 8 of the body member 2, which are outwardly inclined at 39 and then retracted rearwardly. FIG. 5 shows that connecting seams 40 at the upper edge of the floats corresponding to those shown in FIG. 6. The seams 40 are formed in an arrangement of upwardly projecting flanges which are covered for this purpose with synthetic material profile bands.

FIG. 7 shows an arrangement of the front panel 88 of the vehicle. It is welded into a marginal web which is formed by the wall part 89 of the vehicle. It is obvious that the plate 88 for the front panel has an inclined edge 88' and a forwardly open side so that the vehicle has a forwardly directed web 90 which runs around the front panel 88. On the outer side of this web is provided a section member 91 which, at its inner end, abuts one of the vehicle walls 89. Member 91 also forms a rearwardly directed web 92. For example the section member 91 is substantially Z-shaped so that the web lying on the vehicle wall strengthens the web 90.

A profiled band 93 of synthetic material is situated around the composite body flange 90 and the rearwardly facing web 92, which band embraces the flanges 90 and 92 and lies form-closed thereon. Such an arrangement can be obtained by heating the synthetic material bands 93. Consequently the position of the seam of the welded front panel 83 includes a covering and is pleasing to look at and water-tight which can withstand impacts. It must also be mentioned that the profile band 93 can be coloured.

FIG. 7 moreover shows a plan view of the outwardly directed flange 94 (the forward end of rubbing strake 30) on which the longitudinal seam of the vehicle is formed. The upwardly projecting web of the flange 94 running parallel to the outer wall of the vehicle 95 is cut adjacent composite flange 90. It can be seen that here also a covering with synthetic material bands 96 could be provided. Preferably the ends of the synthetic material band 96 facing the profile band 93 are welded to the profile band 93.

From FIG. 1 it can be seen that the rearwardly, upwardly, inclined angle of the floats 37 and 38 begins directly behind the cut-out for the door 12. Moreover, it can be seen that an air lead-in channel or duct 41, with an opening 42 extending rearwardly and having a triangular section is provided corresponding to the shape of the floats. The inner wall of the lead-in channel 41 begins at the root of the floats directly adjacent to the side wall 7 or 8 of the body shell and extends rearwardly inclined to the middle of the vehicle so that the cross-section of the lead-in channel increases rearwardly. The lead-in channel opening 42 leads to the motor chamber 18 so that the cooling air for the motor 48 enters at the outer walls of the vehicle. The rear part of the outer side of the floats is closed by the side wall of the vehicle.

The rearwardly diverging shape of the floats 37 and 38 is accentuated by grating bars 43, 44 which extend rearwardly, diverging above the entire length of the floats, and covering the lead-in channel in the form of a grating. The bars 43, 44 are preferably covered with, for example, coloured synthetic material.

In this embodiment also the noise of the motor is guided outwardly, i.e., not in a direction towards the cockpit. The vertical arrangement of the ventilation openings 42 in conjunction with their position relative to the rubbing strake 30, hinders extensively any shipping of spray water.

With reference to FIG. 5 it must be mentioned that for exiting the fresh air between the rear ends of the covering wall 36 and the rear wall or transom 45, an exhaust vent 46 is provided which extends between the floats 37 and 38 along the upper edge of transom 45.

From FIG. 2 it can be seen that the motor chamber 18 is sub-divided by a rear intermediate bulkhead wall 47 which lies behind the space provided for receiving the driving unit 48. The bulkhead 47 mounts the radiator cooler 49. The ventilation openings 42 feed into the part of the chamber 18 containing the drive unit 48. A housing block 51 is flanged to the front side of the drive unit 48, which block 51 at its front end is connected to or forms a relatively wide drive 55 which has two drive gear trains 110 and 111 for two intermediate propeller drive shafts 56 and 57. These shafts are fastened for example by a flanged coupling 115 to the projecting end of the crankshaft of the drive 48, and they also lead to the propeller shafts 106 and 107 through the intermediary of the universal joints 102, 103, 104 and 105, shown schematically in FIG. 2. The preferred embodiment shows an arrangement with two propeller shafts 106 and 107 and two screw propellers 63, 64. Behind the drive unit 48 is provided a motor driven fan or ventilator 108 which is situated in front of the cooler 49.

The housing 51 contains the differential 112 whose output shafts are connected to the rear wheels through couplings connected to rear wheel axles 97 and 98. The couplings and the rear wheel axles are disposed within water tight enclosures 70 and 71, illustrated in FIG. 3. The rear wheel axles 97 and 98 are, for example, movable within the sealed sections 70, 71 in the vertical direction, the remaining parts thereof pass above torsion bar springs 98 and 99. These torsion bar springs are fastened in sockets 100 and 101 extending into the well of the vehicle.

Furthermore, the gear shift or transmission 113 for driving the wheels is provided inside the housing 51 behind the reduction gear drive 55. A clutch coupling 109 seats for example on the crankshaft of the drive unit 48 and is likewise positioned in the block 51. Driving means for movement on land or water i.e., the wheels and propellers, can be coupled simultaneously by this clutch 109.

Normally gear drive 55 is connected for idling during movement on land. As soon as movement on water is desired it is sufficient to shift in this drive. After the vehicle is in the water then the wheels can be stopped by disengaging the drive connected thereto.

From the foregoing description it is seen that housing 51 has transmission 113 and differential 112 disposed in its lower portion. The drive shaft 116 of engine 48, including couplings 115 and clutch 109, is disposed above the transmission and differential and extends to the drive unit 55. Within the drive unit, shaft 116 is connected by a gear train (not shown) to transmission 113. Additionally, shaft 116 is connected through gear trains 110 and 111 to propeller drive shafts 56 and 57 which extend downwardly and rearwardly from the upper outer corners of housing 55. Propeller drive gear trains 110 and 111 include clutch means for disengaging the propeller shafts from the engine drive shaft 116. Clutch 109 functions as a master clutch to disengage the land and sea propulsion units from engine 48. The clutch mechanism associated with gear trains 110 and 111 are operable independently of clutch 109 so that the propellers may be disengaged when the vehicle is operating on land.

Both gear shift rods leading from the housing 51 are designated 54 and are connected to a gear shift lever on the instrument panel in a manner not shown.

It can be seen that each propeller shaft 106, 107 is guided in a propeller channel or tunnel 58 (see FIG. 4) which has its upper limit at the well in the forward wall 59 inclined rearwardly in cross section. The upper part of the screw channel 58 as shown in FIG. 5 has a semi-circular downwardly concave cross-section 150 in the upper part. Its side walls 152 and 153 extend substantially vertical. The side walls 152 disposed closest to the middle of the vehicle are formed by a central section 62 of the floor well, whereas the outermost side walls 153 of the propeller tunnels 58 are parts of the wheel recesses provided for the rear wheels. It must also be mentioned that the outer walls 153 reach just short of the front of the propellers 63, 64 at the end of the shafts 106 and 107 (see FIGS. 1 and 4), so as to provide a good hydrodynamic guidance of the water. In order to protect the propellers the lower edges of the side walls are provided with skegs or spurs 65 which extend rearwardly below the propeller blades 63 and give a good protection thereto.

FIG. 4 shows yet another support 66 for the propeller shaft and its bearing in the propeller channel.

The substantially horizontal upper side of the propeller channel 58 is positioned well above the plane of the floor of the well 1 centrally of the vehicle so that the propellers 63 and 64 are also disposed above the central floor 1, whereby guidance of the water to the propellers and improved protection of the rigidly constructed propeller shafts are provided. The arrangement of both profiled propeller channels 58 inside the floating body provides structural stability for the remainder of the vehicle constructed with the flat floored well.

I claim:

1. An amphibious vehicle comprising a body having a buoyant hull member defining the lower portion of the body, the hull member having spaced apart longitudinal side walls, the hull member defining a well having a floor disposed in a substantially horizontal plane, a plurality of rotatable wheels disposed exteriorly of the hull member, a motor disposed inside the hull member adjacent the rear of the vehicle, the motor having a rotatable shaft extending forwardly of the motor, two of the plurality of wheels being spaced apart from each other transversely of the rear of the vehicle, axle means connected to each of said two wheels and extending into the interior of the hull member and being sealed in water-tight relation to the exterior of the hull member, a differential disposed between the axle means and operatively connected thereto, a transmission unit operatively connected to the differential and disposed forwardly of the differential within the hull member, first drive means connected between the motor shaft and the transmission and including first selectively operable means for releasably connecting the transmission to the motor shaft, a pair of rotatable propeller shafts extending exteriorly of the hull member, each propeller shaft having an outboard end disposed rearwardly of the hull member well above the plane of the well floor, each propeller shaft further having an inboard end disposed interiorly of the hull member within the well, a propeller secured to the outboard end of each propeller shaft for rotation with said shaft, means operatively connected between each propeller shaft and the motor shaft for rotation of the propeller shafts in response to rotation of the motor shaft and including second selectively operable means for releasably coupling the propeller shafts to the motor shaft.

2. An amphibious vehicle according to claim 1 wherein the means operatively connected between each propeller shaft and the motor shaft comprises a drive unit housing, three gear trains disposed within the housing, a drive shaft connected between the motor shaft and the housing, a clutch connected between the drive shaft and the motor shaft, two of the gear trains being connectable between the drive shaft and the propeller shafts, the third gear train being connected between the drive shaft and the transmission, the housing being disposed in the hull member forwardly of the transmission.

3. An amphibious vehicle according to claim 1 wherein the second selectively operable means are associated with the propeller shaft gear trains, and including a pair of intermediate propeller shafts each extending rearwardly and downwardly from the housing to the inboard end of a corresponding propeller shaft adjacent the transmission and differential.

4. An amphibian vehicle comprising an upper body part and a lower body part, said lower body part forming a buoyant tub-like body with side walls extending upwardly to a level corresponding to a rubbing strake on a boat, said upper and lower body parts being formed with outwardly bent flanges extending along the entire length of the side walls, said bent flanges being formed on mating edges of said upper and lower body parts and bent outwardly and then back substantially parallel to the adjacent upper and lower body parts, respectively, said outwardly bent portions of the flanges being juxtaposed to form a projection having a T-shaped cross-section, a covering of plastic material profiled to correspond to the projection cross-section disposed on those portions of said projection which extend parallel to said side walls of said upper and lower body parts, wheels mounted to the lower body part, a drive unit disposed in the lower body part, first drive means connected between at least two wheels and said drive unit, two spaced apart propellers rotatably mounted exteriorly of the vehicle body, second drive means connected between said drive unit and said propellers, and selectively operable clutch means connected between the first and second drive means and the drive unit.

5. An amphibian vehicle comprising an upper body part and a lower body part, said lower body part forming a buoyant tub-like body with side walls extending upwardly to the level corresponding to a rubbing strake on a boat, a front plate closing the forward end of the vehicle and a flat stern wall defining the rear end of the vehicle, said front plate being provided peripherally thereof with a forwardly bent flange resting against and being fixed to the adjacent wall sections of said upper and lower body parts, said upper and said lower body parts being formed with outwardly bent flanges extending along the entire length of the side walls, said flanges being rigidly connected together and provided with a first deformable covering, a plurality of wheels mounted to the lower body part, a drive unit disposed in the lower body part, first drive means connected between at least two of the wheels and said drive unit, two spaced apart propellers rotatably mounted exteriorly on the vehicle body, second drive means connected between said drive unit and said propellers, and selectively operable clutch means connected between the first and second drive means and the drive unit.

6. An amphibian vehicle according to claim 5 wherein an outwardly and then rearwardly bent member is disposed exteriorly of the wall sections of said upper and lower body parts, a second deformable covering of plastic material disposed between the rearwardly directed part of said bent member and the bent front plate flange, said second covering being connected with said first covering.

7. An amphibian vehicle comprising an upper body part and a lower body part, said lower body part forming a buoyant tub-like body with side walls extending upwardly to the upper body part, a plurality of wheels mounted to the lower body part, a drive unit disposed in a rear portion of the lower body part, first drive means connected between at least two wheels and said drive unit, two spaced-apart propellers rotatably mounted exteriorly of the vehicle, second drive means connected between said drive unit and said propellers, said lower body part comprising a first channel extending transversely of a longitudinal axis of the vehicle internally of a forward part of the vehicle, said channel being sealed to the inner sides of the side walls and to the bottom of the lower body part and opening exteriorly of the vehicle, two inwardly extending horizontal channels in the rear part of the lower body part to accommodate axles for spaced apart rear wheels of the vehicle, said two channels being axially aligned and opening to the exterior of the vehicle, said axles comprising said first drive means, and longitudinally oriented reinforcing members connected to the bottom of the lower body part internally of the vehicle between said first channel and two channels.

8. An amphibian vehicle according to claim 7 wherein the lower body part bottom surface slopes upwardly forward of said first channel and including a horizontally disposed trapezoidally configured structural frame disposed at least in part over the first channel on the upper surface of the first channel, the structural frame comprising a shorter transversely oriented beam fixed to the upwardly sloping lower body part portion, a longer transversely oriented beam fixed to the lower body part rearwardly of the first channel and overlying the longitudinal reinforcing members, and substantially longitudinally disposed beams of the frame connecting adjacent ends of the transversely oriented beams and supporting the side walls of the lower body part.

9. An amphibian vehicle comprising an upper body part and a lower body part, said lower body part forming a buoyant tub-like body with side walls extending upwardly to the upper body part, a plurality of wheels mounted to the lower body part, a drive unit disposed in the lower body part, first drive means connected between at least two wheels and said drive unit, two spaced apart propellers rotatably mounted exteriorly of the rear of the vehicle body, second drive means connected between said drive unit and said propellers, two longitudinally disposed and transversely spaced apart propeller tunnels formed in the rear of the lower body part, the tunnels opening downwardly and rearwardly of the vehicle, a central portion of the lower body part defining and separating the tunnels, and a propeller shaft extending axially of each tunnel to a rear end, the propellers being mounted at the rear ends of the shafts, the tunnels being oriented relative to the vehicle whereby the propellers are disposed above the lower surface of the lower body part centrally of the vehicle.

10. An amphibian vehicle according to claim 9 wherein a transverse cross-section of each of the propeller tunnels is a downwardly concave semicircular curved portion and a longitudinal cross-section of each propeller tunnel extends upwardly rearwardly and then horizontally to the rear end of the tunnel.

11. An amphibian vehicle comprising an upper body part and a lower body part, said lower body part forming a buoyant tub-like body with side walls extending upwardly to the upper body part, wheels mounted to the lower body part, a drive unit disposed in the lower body part, first drive means connected between at least two wheels disposed at the rear of the vehicle and said drive unit, two spaced apart propellers rotatably mounted exteriorly of the vehicle body, second drive means connected between said drive unit and said propellers, the vehicle defining a passenger compartment centrally of the vehicle, a seat in the passenger compartment, a bulkhead transversely of the vehicle adjacent the rear end of the vehicle, a wall behind the seat, the wall and the bulkhead defining a motor chamber in the vehicle, a radiator disposed in the bulkhead, and a motor chamber exhaust opening adjacent an upper edge of the bulkhead.

12. An amphibious vehicle comprising a body having a lower part thereof formed as a buoyant hull member, the hull member defining a well having a floor, said well extending substantially from the forward portion of the vehicle to the rear portion of the vehicle, a plurality of wheels mounted on the body, a motor disposed inside the body, first rotatable drive shaft means between the motor and two of the wheels spaced apart transversely of the vehicle, first means for releasably coupling the first drive shaft means to the motor, at least one propeller rigidly but rotatably mounted exteriorly of the body for propelling the vehicle in water, second rotatable drive shaft means disposed between the motor and the propeller, second means for releasably coupling the second drive shaft means to the motor, means for releasably coupling the first and second drive shaft means simultaneously to the motor, a pair of steerable wheels spaced apart transversely of the vehicle and disposed exteriorly of the hull member adjacent the forward portion of the vehicle, wheel steering means disposed above the well floor and operably connected to the steerable wheels, and transverse inverted channel means disposed interiorly of the hull member secured to the well floor in watertight sealing relation and enclosing the steering means therein, the hull member having spaced apart longitudinal side walls, the channel member further being secured in watertight sealing relation to the side walls, the interior of the channel means opening to the exterior of the hull member.

References Cited in the file of this patent

UNITED STATES PATENTS

| | | |
|---|---|---|
| 1,749,276 | Edmonds | Mar. 4, 1930 |
| 2,058,282 | Whitesell | Oct. 20, 1936 |
| 2,350,037 | Hofheins et al. | May 30, 1944 |
| 2,371,013 | Woswnitz | Mar. 6, 1945 |
| 2,563,731 | Masterson | Aug. 7, 1951 |
| 2,981,221 | Gillois et al. | Apr. 25, 1961 |
| 2,995,104 | Mills | Aug. 8, 1961 |